US012562476B2

(12) United States Patent
Schröter et al.

(10) Patent No.: US 12,562,476 B2
(45) Date of Patent: Feb. 24, 2026

(54) ANTENNA TUNING METHOD AND WIRELESS NODE

(71) Applicant: Diehl Metering Systems GmbH, Nuremberg (DE)

(72) Inventors: Simon Schröter, Erlangen (DE); Gerhard Becke, Forchheim (DE); Christoph Schmidt, Nuremberg (DE); Nicole Zocher, Wolframs-Eschenbach (DE)

(73) Assignee: Diehl Metering Systems GmbH, Nuremberg (DE)

( * ) Notice: Subject to any disclaimer, the term of this patent is extended or adjusted under 35 U.S.C. 154(b) by 410 days.

(21) Appl. No.: 17/986,200

(22) Filed: Nov. 14, 2022

(65) Prior Publication Data

US 2023/0155289 A1 May 18, 2023

(30) Foreign Application Priority Data

Nov. 16, 2021 (DE) ..................... 10 2021 129 836.9

(51) Int. Cl.
*H01Q 5/314* (2015.01)
*H01Q 1/24* (2006.01)

(52) U.S. Cl.
CPC ............. *H01Q 5/314* (2015.01); *H01Q 1/243* (2013.01)

(58) Field of Classification Search
CPC ............................... H01Q 5/314; H01Q 1/243
See application file for complete search history.

(56) References Cited

U.S. PATENT DOCUMENTS

| | | | | |
|---|---|---|---|---|
| 2,129,711 A * | 9/1938 | Southworth | H04B 3/52 455/39 |
| 2014/0015719 A1* | 1/2014 | Ramachandran | H01Q 1/243 343/745 |
| 2014/0198009 A1* | 7/2014 | Nagumo | H01Q 21/30 343/852 |
| 2015/0280675 A1* | 10/2015 | Langer | H03G 3/3042 455/127.2 |
| 2015/0358053 A1* | 12/2015 | Tsuji | H04B 5/48 455/41.2 |
| 2018/0026361 A1* | 1/2018 | Sakong | H01Q 1/48 343/860 |
| 2019/0027833 A1* | 1/2019 | Ayala Vazquez | H01Q 5/342 |
| 2019/0393586 A1* | 12/2019 | Ayala Vazquez | H01Q 5/328 |
| 2020/0187127 A1* | 6/2020 | Mofidi | H04W 52/50 |

(Continued)

FOREIGN PATENT DOCUMENTS

| | | |
|---|---|---|
| EP | 3285403 A1 | 2/2018 |
| EP | 3476004 B1 | 9/2020 |

(Continued)

*Primary Examiner* — David Bilodeau
(74) *Attorney, Agent, or Firm* — Laurence A. Greenberg; Werner H. Stemer; Ralph E. Locher

(57) ABSTRACT

A method improves antenna matching for a wireless node, preferably of a sensor wireless node and/or actuator wireless node. A radio signal, or at least a portion thereof, is coupled out of the antenna and/or out of the transmit path of the wireless node. The impedance and/or the resonant frequency of the antenna is determined therefrom in the wireless node, and the impedance and/or the resonant frequency of the antenna is adjusted according to the determined impedance and/or resonant frequency by a circuit acting on the antenna.

19 Claims, 8 Drawing Sheets

(56) References Cited

U.S. PATENT DOCUMENTS

| | | | | |
|---|---|---|---|---|
| 2021/0399429 | A1* | 12/2021 | Garrido Lopez ........ | H01Q 1/44 |
| 2023/0113692 | A1* | 4/2023 | Huynh .................... | H02J 50/20 455/41.1 |

FOREIGN PATENT DOCUMENTS

| | | | |
|---|---|---|---|
| EP | 3731419 | A1 | 10/2020 |
| EP | 3734843 | A1 | 11/2020 |
| WO | 2018215973 | A1 | 11/2018 |

* cited by examiner

ANTENNA TUNING METHOD AND WIRELESS NODE

CROSS-REFERENCE TO RELATED APPLICATION

This application claims the priority, under 35 U.S.C. § 119, of German Patent Application DE 10 2021 129 836.9, filed Nov. 16, 2021; the prior application is herewith incorporated by reference in its entirety.

FIELD AND BACKGROUND OF THE INVENTION

The present invention relates to a method for improving the antenna matching for a wireless node, and to a wireless node.

Wireless nodes are used in various sectors. Wireless nodes may be sensor nodes, actuator nodes or nodes that are a combination thereof. For example, such wireless nodes are used in consumption meters for transmitting measurement data. Consumption meters may be flow meters or electricity meters, for example. The wireless nodes are as small as possible in these cases.

The achievable wireless range of the wireless node depends on the antenna detuning. The greater the antenna detuning, the lower the radiated transmit power of the wireless node in the transmit case, and the smaller the achievable range of the radio signal. In the receive case, the antenna detuning reduces the receive sensitivity of the wireless node, which likewise leads to a shorter-range radio link. The antenna detuning depends on influences from the surroundings, for instance the installation situation, metal parts or dielectrics in the vicinity of the wireless node, and on manufacturing tolerances of the components. It is therefore desirable for the wireless module to have good antenna tuning in order to achieve sufficient quality of the radio signal.

A mains connection for supplying energy is typically not available, and therefore batteries must be used to supply the wireless nodes with electrical energy in a manner that is energy self-sufficient. These batteries are preferably long-life batteries. The batteries cover the full service life of the meter, which is typically in the region of 12 to 16 years. The energy consumption of the wireless node during wireless communication likewise depends on the antenna detuning. Depending on the power amplifier used in the wireless node, detuning of the antenna can result in greater energy consumption by the wireless node than in the nominal operating case without antenna detuning.

It is therefore important to take measures to maintain the radiated transmit power, the receive sensitivity and the energy consumption of the wireless node even when antenna detuning is present.

European patent application EP 3 285 403 A1 discloses a method for improving the antenna matching in a smart meter. Stored in the smart meter are various antenna tunings, which are used by the smart meter in sending out data packets. In this process, a meter sends out origin-coded packets successively in the uplink to a concentrator at a defined transmit frequency using different tuning settings for the antenna matching. These packets are received in a concentrator, where their receive field-strength is analyzed. The settings that resulted in viable reception are transmitted in the downlink back to the meter, which from then onwards transmits using these antenna-matching settings. Only limited antenna matchings can be selected, and also a load is placed on the radio channel during the matching. Furthermore, the method requires a bidirectional radio system between the smart meter and the concentrator. Consequently, the method cannot be performed autonomously by the smart meter. Moreover, this method requires greater expenditure of energy.

SUMMARY OF THE INVENTION

The object of the present invention is to provide an improved antenna adaptation method.

The aforementioned object is achieved by a method having the features of the independent method claim and by a wireless node having the features of the independent wireless node claim. The associated dependent claims claim expedient embodiments of the method according to the invention and of the wireless node according to the invention.

According to the invention, a radio signal, for instance a radiofrequency (RF) signal, or at least a portion thereof, is coupled out of the antenna and/or out of the transmit path of the wireless node, the impedance and/or the resonant frequency of the antenna, or the antenna detuning, is determined or estimated therefrom in the wireless node, and the impedance and/or the resonant frequency of the antenna is adjusted according to the determined impedance and/or resonant frequency by a circuit acting on the antenna. By virtue of the circuit acting on the antenna, the impedance and/or the resonant frequency of the antenna in the wireless node can hence be adjusted without the need for an uplink or downlink connection. The entire method can thus be performed independently, i.e. autonomously, by the wireless node. Thus the method does not depend on a receiver or higher-level data collector, and can be performed even when the wireless node is not in a network. By adjusting the impedance and/or resonant frequency of the antenna, it is possible to compensate for influences from the surroundings and/or manufacturing tolerances of the wireless node and/or ageing effects that cause antenna detuning.

The circuit acting on the antenna expediently contains a preferably switchable network, which contains at least one capacitance, preferably a plurality of capacitances, and/or at least one inductance, preferably a plurality of inductances. The at least one capacitance and/or the at least one inductance affect(s) the impedance and/or resonant frequency of the antenna. Provided these are connected together in a switchable network, the impedance and/or resonant frequency of the antenna can be altered by switching the network connections. The individual capacitances and/or inductances can expediently be actuated individually. In particular, the capacitances and/or inductances can have different values.

Expediently, the circuit acting on the antenna can comprise at least one varactor diode. The varactor diode comprises a variable capacitance that depends on a control voltage applied to the varactor diode, in particular a DC control voltage. The larger the control voltage, the smaller the capacitance of the varactor diode, and vice versa.

Advantageously, the circuit acting on the antenna can be coupled galvanically or capacitively or inductively, i.e. by radiated coupling, to the antenna. For this purpose, the antenna can be configured to have coupling structures, for instance coupling regions for capacitive coupling or coupling loops for inductive coupling. The capacitive or inductive coupling of the variable impedance to the antenna can hence be achieved more easily.

The galvanic or capacitive or inductive coupling of the circuit acting on the antenna to the antenna can preferably be provided, for example, at any region of the antenna, and/or at the antenna base. For this purpose, the antenna can be expediently configured such that it can be connected, for instance galvanically, at other regions apart from the base to the circuit acting on the antenna. In this case, the transmit path and the circuit acting on the antenna can have separate coupling points to the antenna. In the other case, the transmit path and the circuit acting on the antenna can have a common coupling point to the antenna.

By the at least one capacitance being a coupling capacitor and/or the at least one inductance being an inductor, the control circuit of the circuit acting on the antenna can be decoupled from the antenna to avoid interference.

It is hence possible to avoid the radio signal from the antenna interfering with the operation of the microcontroller.

The circuit acting on the antenna expediently contains a microcontroller and/or a controller. The microcontroller and/or the controller can alter the actuation of the circuit acting on the antenna and thereby influence the impedance and/or resonant frequency of the antenna. The microcontroller and/or the controller can thus alter or adjust the impedance and/or resonant frequency of the antenna. The microcontroller is in particular a digital control device. The controller may be digital or analog.

Advantageously, in order to couple out the radio signal, or at least a portion thereof, from the antenna and/or the transmit path, a wave reflected by the antenna is coupled out, or the power or RF power radiated by the antenna, or at least a portion thereof, is picked up, or the energy or RF energy on the antenna, or at least a portion thereof, is picked up, or a portion of a radio signal resulting from the superposition of a forward wave and a wave returning or reflected from the antenna is picked up.

The return wave from the antenna, as per the first alternative, here corresponds to the part of the radio signal that was not emitted and not converted into dissipated heat in the antenna. The larger the return wave, the worse the antenna tuning. In this case, the return wave is preferably coupled out of the transmit path by a coupler, in particular a hybrid coupler or a directional coupler.

In contrast, the magnitude of the RF power or RF energy radiated by the antenna, as per the second or third alternative, depends on the power or energy of the radio signal on the antenna. The RF power or RF energy is picked up via a preferably radiation-coupled coupling antenna and/or a sensor element and/or a coupling-out element, for instance a coupling-out resistor.

The pickup of the portion of the radio signal, as per the fourth alternative, is expediently performed via a coupling-out resistor, for instance located in the transmit path. The portion of the radio signal, or of its RF voltage, picked up thereby is a superposition of the voltages of the forward wave and the return wave.

It is hence possible to pick up the radio signal, or at least a portion thereof, in various ways. The return wave or the picked-up power or the picked-up energy or the picked-up portion of the radio signal are influenced in these cases by the impedance and/or the resonant frequency of the antenna. Thus these can be analyzed to determine the antenna detuning.

By being able to supply the return wave or the picked-up power or the picked-up energy or the picked-up portion of the radio signal to a rectifier circuit, for instance a rectifier circuit composed of diodes, the rectifier circuit can output a DC voltage that depends on the return wave or the picked-up power or the picked-up energy or the picked-up portion of the radio signal. The DC voltage output by the rectifier circuit hence provides information about the impedance and/or the resonant frequency of the antenna, or about the antenna detuning. A minimum or a maximum of the DC voltage output by the rectifier circuit can thereby preferably correspond to a desired or optimum antenna matching. Alternatively, a desired or optimum antenna matching can exist when the DC voltage corresponds to a reference voltage value. The DC voltage is preferably fed to the microcontroller for analysis and/or for controlling the circuit acting on the antenna.

It is possible to dispense with a rectifier circuit by digitizing the return wave or the picked-up power or the picked-up energy or the picked-up portion of the radio signal, i.e. the RF signal in each case, directly by sampling or by means of an analog-to-digital converter. Hence there is additionally available digitized information about the impedance and/or the resonant frequency of the antenna or about the antenna detuning, which, like the DC voltage from the rectifier circuit, can be analyzed. This digitized information can be provided to an analysis algorithm.

By being able to perform a phase comparison between the radio signal coupled out of the antenna or the picked-up RF power or RF energy and the radio signal coupled out of the transmit path, it is possible to determine from the phase difference the direction of the antenna detuning. The circuit acting on the antenna can hence be influenced in a specific direction so that there is no need to sweep through the entire tuning range of the antenna. The phase comparison can be carried out by a phase comparator, for instance a mixer made of diodes, which can output a DC voltage that is dependent on the phase difference. The radio signal is expediently coupled out of the transmit path by means of a power splitter.

The antenna matching can preferably be performed by means of a binary search process or by means of an algorithm, in particular an iterative algorithm, or by means of a SWEEP process or in a closed-loop control system. The SWEEP process is carried out by the microcontroller, for example. In this process, the microcontroller sweeps or moves or cycles through the individual antenna matchings on the basis of the variable impedance or different control-voltage values for the varactor diode, so as to cover the impedances and/or resonant frequencies in the preferably entire tuning range of the antenna. It is thereby possible to determine a favorable impedance and/or the resonant frequency of the antenna, or the antenna detuning.

In the alternative of the closed-loop control system, the prevailing impedance and/or resonant frequency, or a voltage corresponding thereto, is compared with a reference value. The closed-loop system adjusts the variable impedance so as to achieve a desired or favorable impedance and/or the resonant frequency of the antenna. Further information, for example a direction of the antenna detuning, can expediently be derived from the difference between the prevailing impedance and/or resonant frequency, or the voltage corresponding thereto, in particular and the reference value. The antenna detuning or antenna tuning can thereby be adjusted advantageously immediately while the radio signal is being emitted.

The method advantageously comprises a search phase, in which the impedance and/or the resonant frequency of the antenna and/or the installation situation and/or surroundings situation and/or the manufacturing tolerances of the components of the wireless node can be determined or detected, and in particular can be stored, and an operating phase, during which the impedance and/or the resonant frequency of the antenna and/or installation situation and/or surroundings situation and/or the manufacturing tolerances of the components of the wireless node determined in the search phase is/are compared, for instance at every emission, with the current or present impedance and/or resonant frequency of the antenna and/or installation situation and/or surroundings situation, and a new search phase is started (a) when there is a discrepancy from the comparison and/or (b) periodically at equal or unequal time intervals. The impedance and/or resonant frequency of the antenna can hence be monitored directly, and the search phase can be started directly in the event of a discrepancy. Alternatively or additionally, the search phase can be started automatically periodically, at equal or unequal time intervals. This avoids emitting a radio signal when there is antenna detuning. This hence allows energy-saving operation of the wireless node. The impedance and/or resonant frequency of the antenna determined during the search phase in transmit mode can advantageously be stored and used in receive mode. The receive mode can hence also be implemented with optimum antenna matching.

Being able to adjust the impedance and/or the resonant frequency of the antenna continuously or in discrete steps means that the impedance and/or the resonant frequency of the antenna can be adjusted to suit the circumstances.

The present invention also relates to a wireless node according to the preamble of the independent wireless node claim. According to the invention, the wireless node is operated in accordance with the method claims.

A coupler and/or a coupling antenna and/or a sensor element and/or a coupling-out element and/or a coupling-out resistor is/are expediently provided as coupling-out means.

The coupler and/or the coupling antenna and/or the sensor element and/or the coupling-out resistor and/or the coupling-out element can advantageously be provided as a structure on the printed circuit board.

The wireless node can preferably be operated self-sufficiently in energy. The wireless node expediently comprises for this purpose a battery, for instance a long-life battery.

The wireless node can advantageously be part of a flowmeter or of an electricity meter or of an energy meter or of a consumption meter. In addition, the wireless node can be part of a wireless module for a flowmeter or an electricity meter or an energy meter or a consumption meter.

The wireless node is ideally a mobile or moveable wireless node.

The antenna is expediently integrated on or in the wireless node or housing of the wireless node. In particular, the antenna can be fixedly connected to the wireless node or the housing thereof. This ensures that the wireless node has a compact construction.

The wireless node preferably emits in particular narrowband radio signals in a frequency range of 100 MHz to 500 MHz. Particularly preferably, the wireless node emits in the frequency range 433.0500-434.7900 MHz and/or 169.4000-169.8125 MHz.

The radio transmission expediently takes place at a data rate of less than 250 kbit/s.

Other features which are considered as characteristic for the invention are set forth in the appended claims.

Although the invention is illustrated and described herein as embodied in an antenna tuning method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
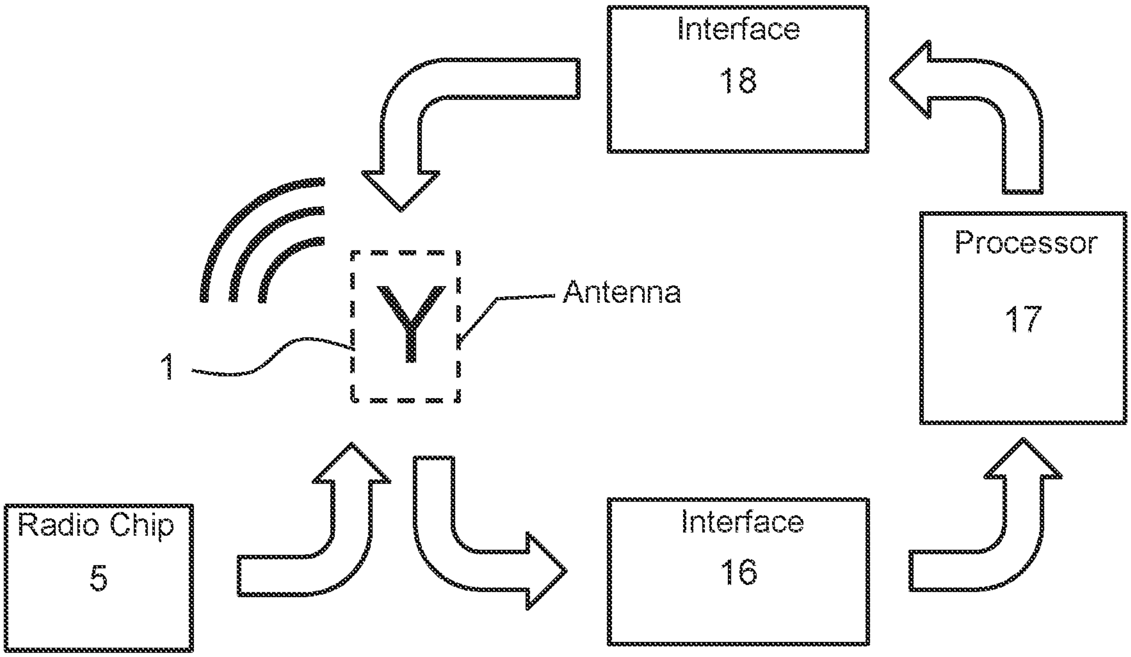
FIG. 1 is a block diagram of an example of a fundamental procedure of the method according to the invention.

Referring now to the figures of the drawings in detail and first, particularly to FIG. 1 thereof, there is shown a block diagram of an example of a basic procedure of the method according to the invention. In this case, a radio chip 5 transmits a radio signal, for instance an RF radio signal, to an antenna 1. The antenna 1 may be integrated on or in the wireless node or housing thereof. According to the invention, the radio signal or at least a portion thereof is coupled out of the antenna 1 and/or out of a transmit path 14 (not shown in the figure) between the radio chip 5 and the antenna 1. The impedance and/or the resonant frequency of the antenna 1 is adjusted according to the determined impedance and/or resonant frequency by a circuit acting on the antenna 1. This corresponds to the basic scheme of the procedure from FIG. 1. The coupled-out radio signal or a portion thereof is supplied via an interface 16 to an open-loop or closed-loop control unit or processing unit 17, which brings about a change in impedance and/or a change in resonant frequency of the antenna 1 via an interface 18. This fundamental method scheme is implemented by advantageous embodiments with reference to the further figures below.

Figure 2:
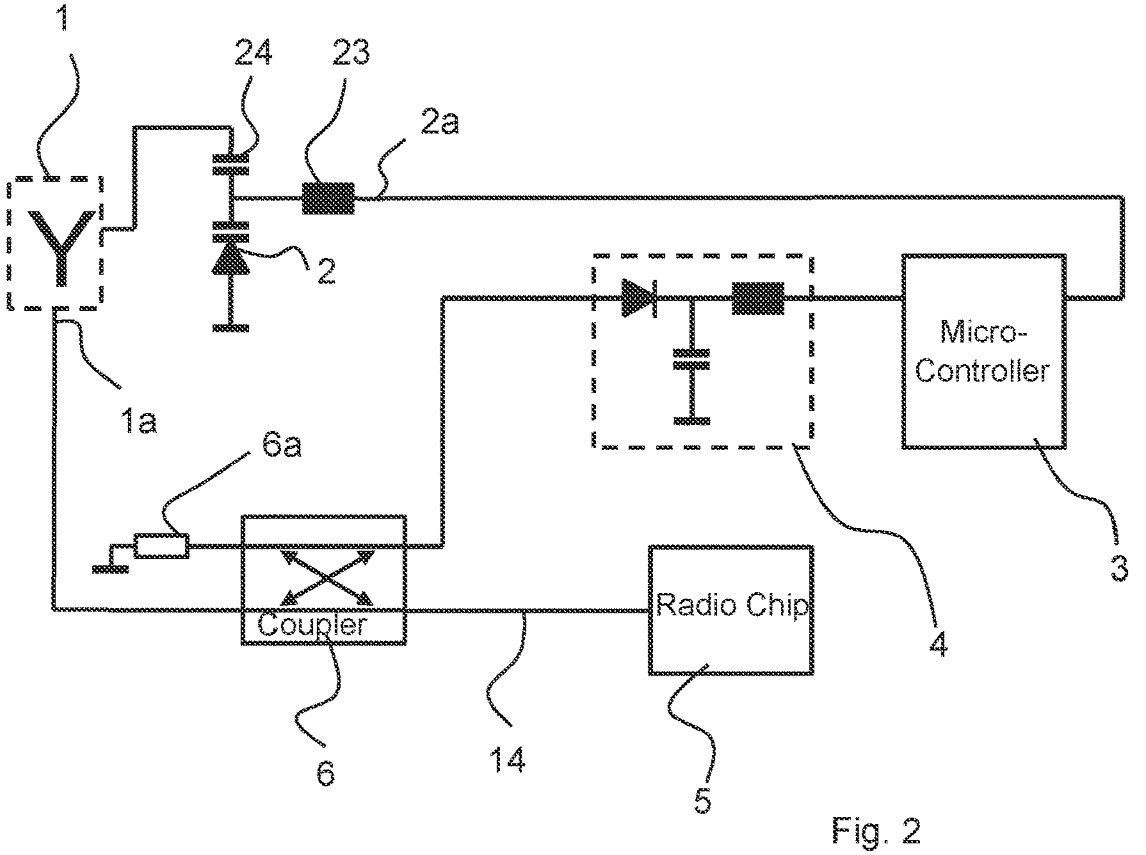
FIG. 2 is a block diagram by way of example of a design of a wireless node for applying the method according to the invention according to a first exemplary embodiment.

FIG. 2 shows the block diagram of the wireless node for applying the method according to the invention according to a first exemplary embodiment. The wireless node comprises the radio chip 5 and the antenna 1, which are connected to each other via the transmit path 14. The radio chip 5 transfers via the transmit path 14 a radio signal, for instance a radiofrequency (RF) signal, to the antenna 1, which emits the radio signal.

Located on the transmit path 14 is a coupler 6, which is connected to a rectifier circuit 4, for example a rectifier circuit composed of diodes. The coupler 6 contains a terminating resistor 6*a*. The wireless node also contains a circuit acting on the antenna 1, which circuit contains a microcontroller 3 and a varactor diode 2. The microcontroller 3 is connected on the input side to the rectifier circuit 4, and on the output side to the varactor diode 2 via the control input 2*a* thereof. The varactor diode 2 is galvanically or capacitively coupled to the antenna 1 or to an antenna base.

The varactor diode 2 is a semiconductor component in which the capacitance is changed by changing an applied control voltage. For this purpose, the microcontroller 3 applies a control voltage, in particular a DC voltage, to the control input 2*a* of the varactor diode 2. Increasing the control voltage at the control input 2*a* lowers the capacitance of the varactor diode 2. Reducing the control voltage at the control input 2*a*, on the other hand, increases the capacitance of the varactor diode 2. The control voltage and/or the capacitance of the varactor diode 2 can expediently be altered in discrete levels.

As a result of the coupling between the antenna 1 and the varactor diode 2, the capacitance of the varactor diode 2 constitutes a capacitive load on the antenna 1. The impedance and/or the resonant frequency of the antenna 1 hence changes according to the capacitance of the varactor diode 2. Consequently, a targeted change in the control voltage for the varactor diode 2 can influence the impedance and/or the resonant frequency of the antenna 1. Since the control voltage and/or the capacitance of the varactor diode 2 can be varied in discrete levels, the impedance and/or the resonant frequency of the antenna 1 can likewise be varied in discrete levels.

In addition, a coupling capacitor is provided as the capacitance 24, and an inductor as the inductance 23. The coupling capacitor and the inductor decouple the control circuit of the varactor diode 2 from the antenna 1, or more precisely from the radio signal of the antenna 1.

According to the first exemplary embodiment, shown in FIG. 2, the radio chip 5 sends a radio signal as a forward wave to the antenna 1 via the transmit path 14, which radio signal is to be emitted. The radio signal to be emitted is fed into the antenna 1 via an antenna base 1*a,* i.e. a radio signal input. Given optimum antenna matching, substantially the entire radio signal is fed into the antenna 1 and emitted by same. In the event of antenna detuning, a portion of the radio signal is reflected by the antenna base 1*a,* and travels back as a return wave towards the radio chip 5. The reflected radio signal depends on the antenna detuning. This means that the greater the antenna detuning, the larger the reflected portion of the radio signal.

The return wave of the radio signal is coupled out of the transmit path 14 by the coupler 6, and thereby separated from the forward wave. The coupler 6 feeds the return wave to the rectifier circuit 4. The rectifier circuit 4 outputs a DC voltage that depends on the return wave, or more precisely the RF power of the return wave. This DC voltage is fed to the microcontroller 3 for further analysis.

As an alternative to the rectifier circuit 4, the return wave can be digitized by sampling or by means of an analog-to-digital converter (not shown in the figures). In this case, it is the amplitude of the RF signal of the return wave that is determined and fed to the microcontroller 3.

In the microcontroller 3 are preferably stored reference values corresponding to different impedances and/or resonant frequencies of the antenna 1. These reference values can be stored as a DC voltage or as an amplitude of the RF signal. Alternatively, the DC voltage fed by the rectifier circuit 4, or the amplitude of the RF signal, can be converted by means of a set of characteristics into a corresponding impedance and/or resonant frequency of the antenna 1, and compared with the stored reference values. It is thereby possible to ascertain whether the antenna is detuned. The antenna matching can be performed by means of a SWEEP process. In the SWEEP process, the microcontroller 3 sweeps or cycles through the individual antenna matchings on the basis of different control-voltage values for the varactor diode 2 so as to cover the tuning range, preferably the entire tuning range, of the antenna 1.

A search phase is started in the situation in which the antenna is detuned or no reference values are stored, for instance during commissioning of the wireless node. Alternatively or additionally, the search phase can be started periodically at equal or unequal time intervals. In the search phase, the antenna matching is performed, for instance, by means of the SWEEP process. This means that during the search phase, the microcontroller 3 increases the control voltage for the varactor diode 2, for instance continuously, from the lower to the upper limit of the tuning range of the antenna 1. This alters, in particular continuously, the load on the antenna 1 and hence its impedance and/or resonant frequency. At the same time, the radio chip 5 sends to the antenna 1 a radio signal to be emitted. The radio signal is reflected by the antenna 1 by different amounts depending on the antenna detuning. As described above, the return wave is coupled out of the transmit path 14 by the coupler 6 and fed to the microchip 3. The microchip 3 hence receives different DC voltages depending on the control voltage for the varactor diode 2.

Since the DC voltage fed to the microcontroller 3 corresponds to the return wave, or the RF power thereof, the antenna 1 is correctly tuned when the DC voltage is a minimum. The microcontroller 3 thus determines the minimum of the DC voltage fed to it. The control voltage for the varactor diode 2 for which the return wave is a minimum is stored in the microcontroller 3 as a reference value and used for subsequent radio transmissions during an operating phase. The search phase is initiated again as soon as it is ascertained that the antenna is detuned again, for instance because of changes in the installation situation, and/or periodically at equal or unequal time intervals.

Figure 3:
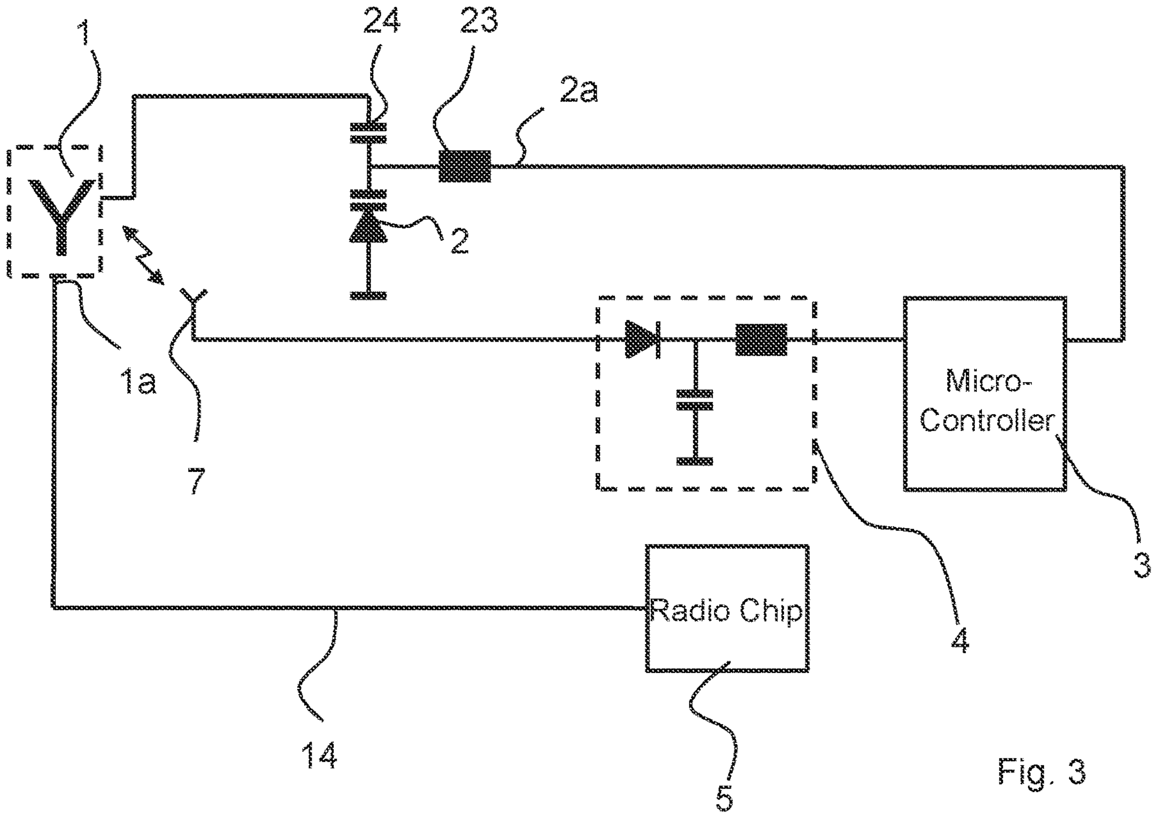
FIG. 3 is a block diagram by way of example of the wireless-node design for applying the method according to the invention according to a second exemplary embodiment.

FIG. 3 shows a second exemplary embodiment of the wireless node for implementing the method according to the invention. The function features of the wireless node in the second exemplary embodiment substantially correspond to the function features of the wireless node in the first exemplary embodiment. In the second exemplary embodiment a coupling antenna 7 is simply provided instead of the coupler 6.

In the second exemplary embodiment, a radio signal to be emitted is likewise supplied by the radio chip 5 to the antenna 1 via the transmit path 14. The antenna 1 emits the radio signal. In this case, at least a portion of the radio-signal energy or power on the antenna 1 is picked up by the coupling antenna 7. The picked-up energy or power depends on the radio-signal energy or power on the antenna 1. The better the matching of the antenna 1 to the radio chip 5 in terms of impedance and/or resonant frequency, the greater the radio-signal energy or power on the antenna 1, and hence the greater the energy or power of the signal picked up by the coupling antenna 7. This is supplied to the rectifier circuit 4 or is digitized, and is supplied to the microcontroller 3 as in the first exemplary embodiment. As described above, it can now be determined whether the antenna is detuned.

In a similar way to the first exemplary embodiment, in the second exemplary embodiment, antenna matching can be performed in the search phase by means of the SWEEP process. The radio-signal energy or power on the antenna 1 depends on the impedance and/or resonant frequency of the antenna 1. Consequently, the antenna 1 is correctly tuned when the radio-signal energy or power on the antenna 1 is a maximum. The microcontroller 3 hence determines during the SWEEP process the maximum of the energy or power picked up by the coupling antenna 7. The corresponding control voltage is now used for subsequent radio transmissions in the operating phase. The search phase is restarted in the event that the antenna is detuned again, and/or periodically at equal or unequal time intervals.

Figure 3A:
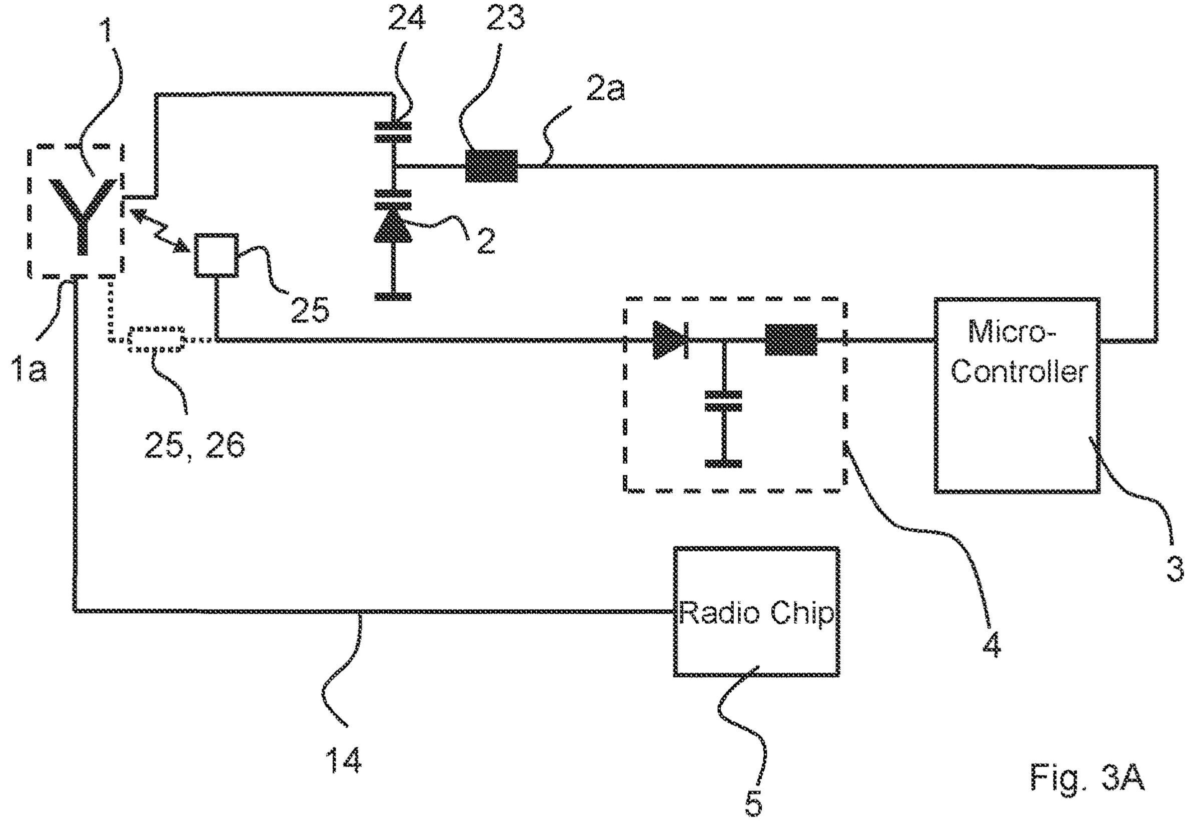
FIG. 3A is a block diagram by way of example of the wireless-node design according to FIG. 3 without a coupling antenna.

Alternatively, at least a portion of the power radiated by the antenna 1 can be picked up as shown in FIG. 3A via a sensor element 25 instead of the coupling antenna 7. This sensor element 25 is here coupled capacitively or inductively or galvanically (shown dashed in FIG. 3A) to the antenna 1. In addition, at least a portion of the energy on the antenna 1 can be picked up via a coupling-out element 26, for instance a coupling-out resistor; cf. dashed representation in FIG. 3A. The further analysis of the picked-up power or energy is performed in a similar way to the second exemplary embodiment.

Figure 4:
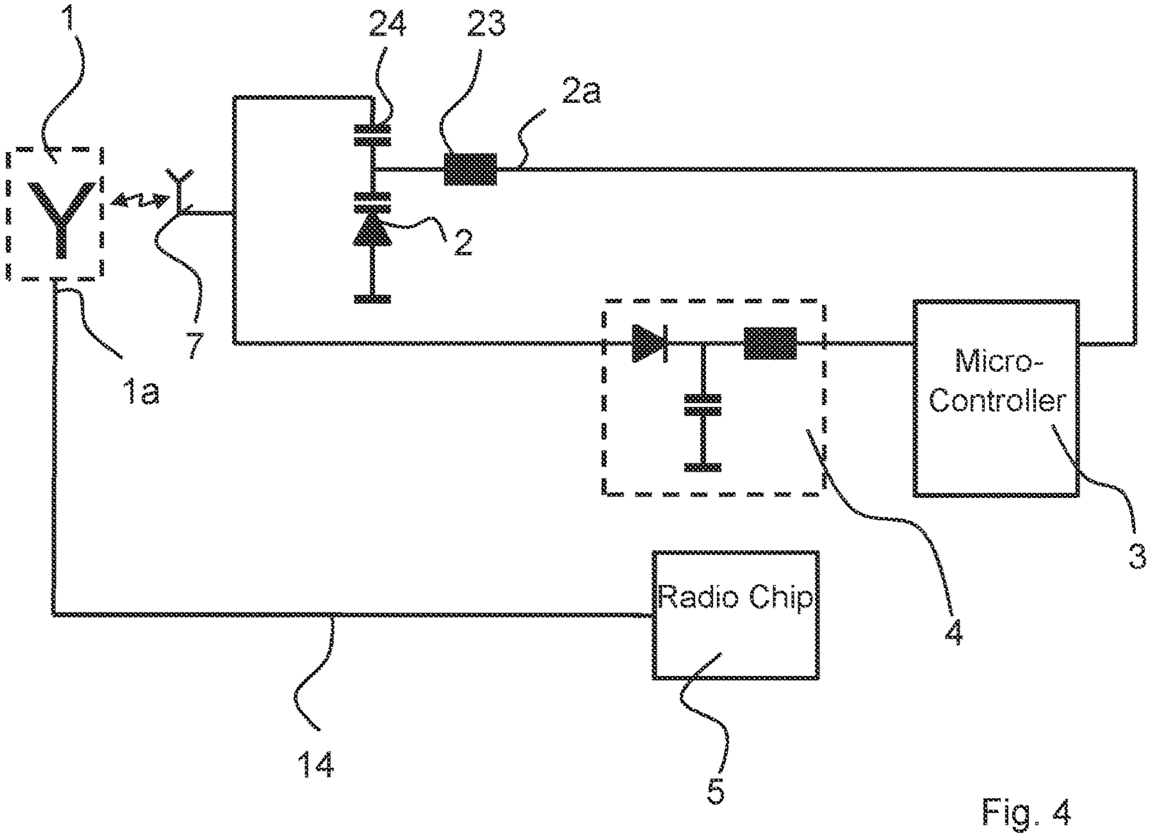
FIG. 4 is a block diagram by way of example of the wireless-node design according to FIG. 3 having a common coupling antenna.

FIG. 4 shows a variant of the wireless node of FIG. 3. In this case, the varactor diode 2 is coupled capacitively to the antenna 1 by means of the coupling antenna 7. Thus the coupling antenna 7 serves not only to couple out the radio-signal energy or power on the antenna 1 but also to act on the antenna 1 in such a way that the varactor diode 2 can adjust the impedance and/or the resonant frequency of the antenna 1.

Figure 5:
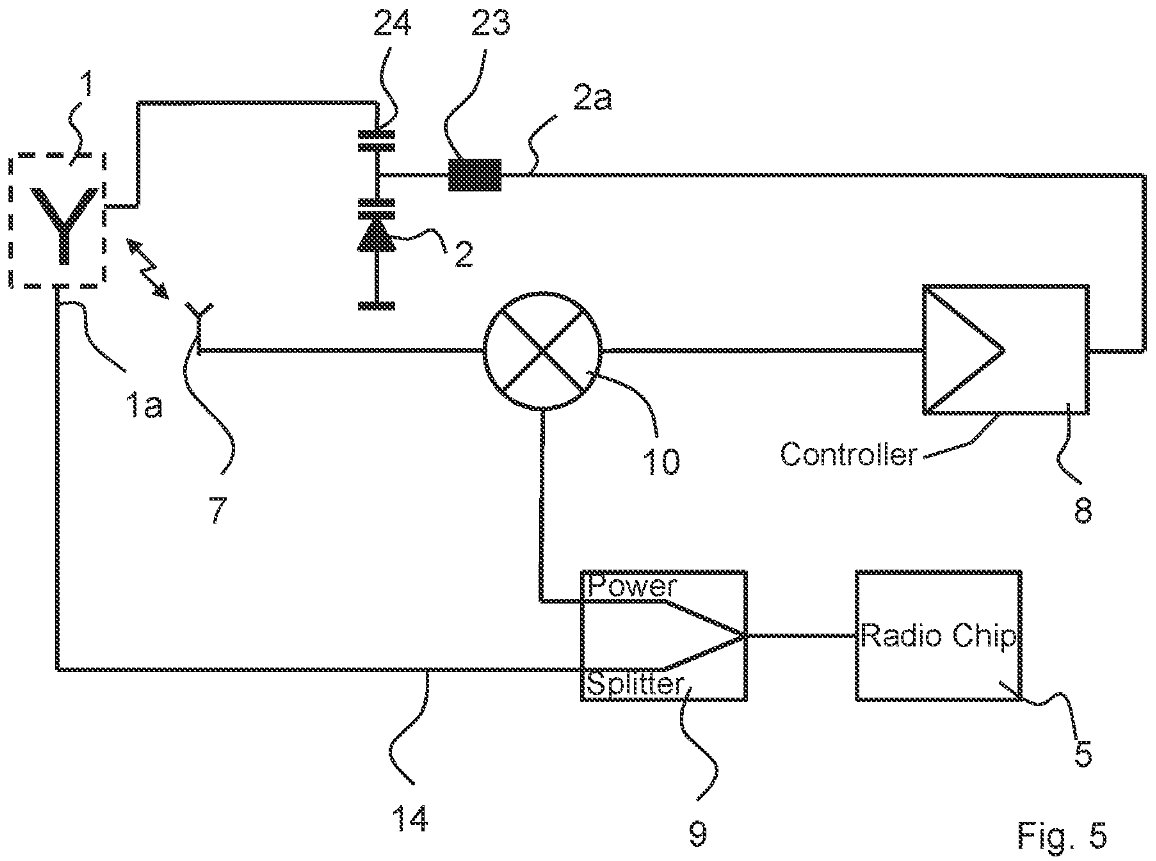
FIG. 5 is a block diagram by way of example of the wireless-node design for applying the method according to the invention according to a third exemplary embodiment.

FIG. 5 shows a block diagram of the design of the wireless node for applying the method according to the invention according to a third exemplary embodiment. As in the previous, second exemplary embodiment, the wireless node comprises a varactor diode 2, an antenna 1, a radio chip 5, a transmit path 14 and a coupling antenna 7. In addition, the wireless node contains a power splitter 9 located in the transmit path 14. The coupling antenna 7 and the power splitter 9 are connected to a phase comparator 10. For example, a mixer made of diodes can act as the phase comparator 10. Furthermore, the circuit acting on the antenna 1 contains a controller 8, which is connected on the input side to the phase comparator 10 and on the output side to the varactor diode 2.

In the third exemplary embodiment, the antenna matching is expediently performed by means of a closed-loop control system. In this case, the radio-signal energy on the antenna 1 is coupled out and supplied to the phase comparator 10, as is the case in the second exemplary embodiment. In addition, a portion of the radio signal in the transmit path 14 is coupled out by the power splitter 9 and likewise supplied to the phase comparator 10. The phase comparator 10 compares the phase of the radio signal picked up from the antenna 1 with the phase of the radio signal picked up in the transmit path 14, and outputs a DC voltage that is dependent on the phase difference.

This DC voltage is fed to the controller 8. The controller 8 compares the applied DC voltage with a reference value or a reference voltage. The reference value equals the value at which there is an optimum or desired antenna matching. Since the applied DC voltage may lie above or below the reference value, the direction of the antenna detuning can be ascertained thereby. The controller 8 increases or decreases the control voltage of the varactor diode 2 accordingly such that the DC voltage applied to the controller 8 equals substantially the reference value.

By using the closed-loop control system to control the antenna matching, the antenna detuning or antenna tuning can be adjusted immediately while the radio signal is being emitted. This avoids a SWEEP process, and any antenna detuning can be corrected directly during a radio transmission.

Figure 6:
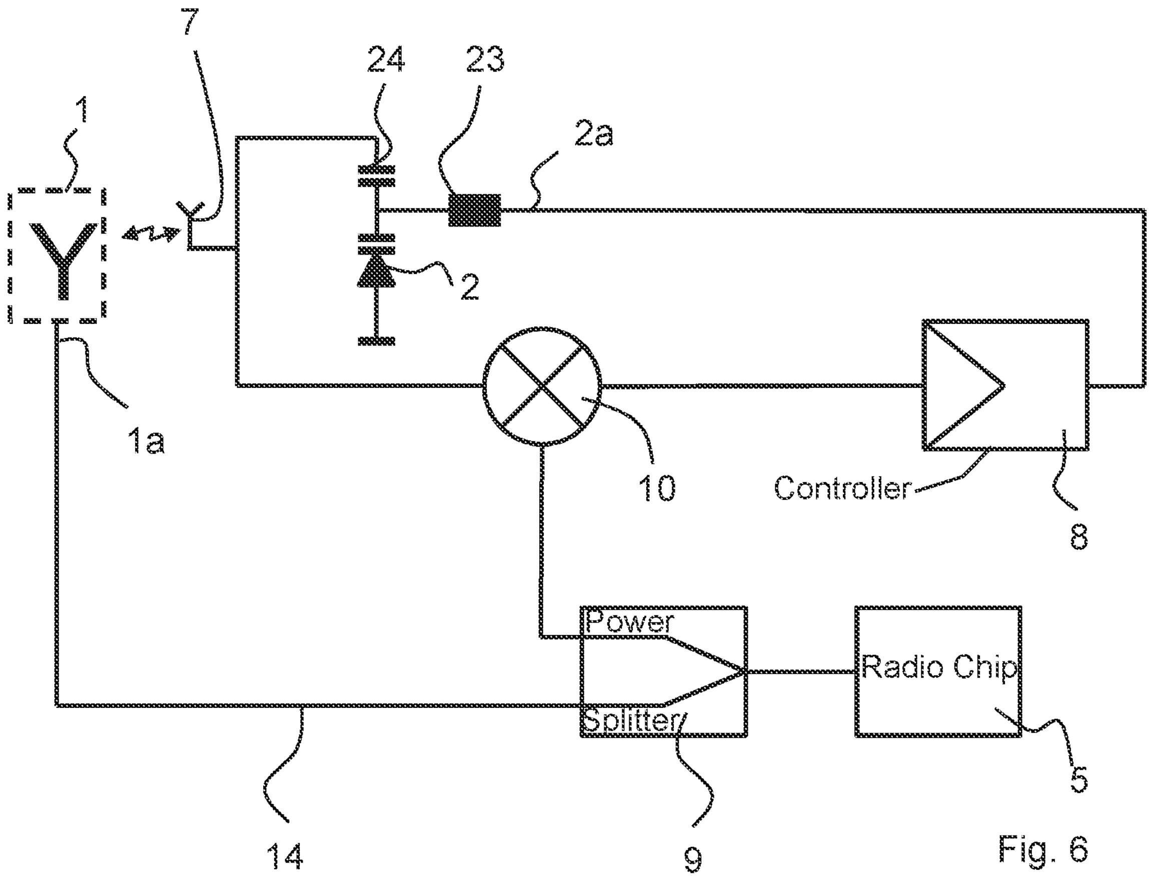
FIG. 6 is a block diagram by way of example of the wireless-node design according to FIG. 5 having a common coupling antenna.

The varactor diode 2 of the third exemplary embodiment can be coupled capacitively to the antenna 1 via the coupling antenna 7, in a similar way to FIG. 4; cf. FIG. 6.

Figure 7:
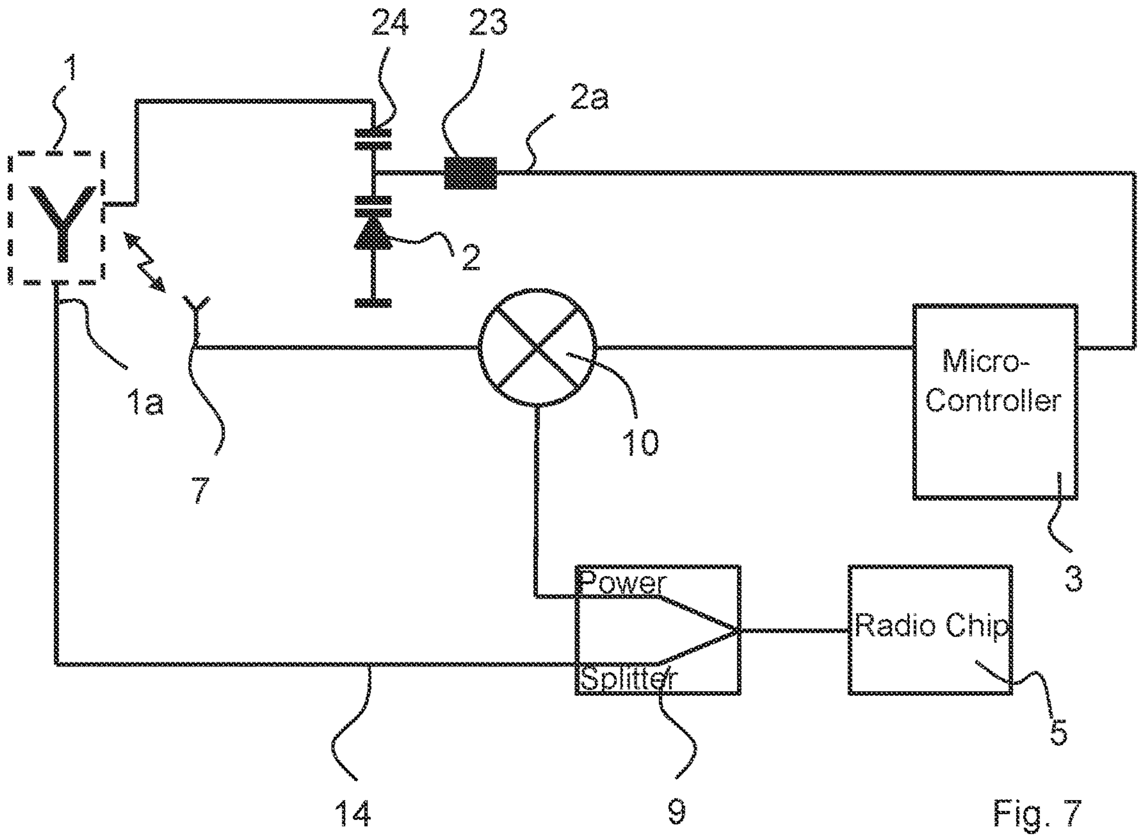
FIG. 7 is a block diagram by way of example of the wireless-node design according to FIG. 5 having a microcontroller.

FIG. 7 shows a block diagram by way of example of the wireless node of FIG. 5, in which a microcontroller 3 is provided instead of the controller 8. In this case, the microcontroller 3 performs essentially the same functions as the controller 8. In addition, the microcontroller 3 can store the control voltages and, in the receive case, can output a control voltage to the varactor diode 2, with the result that antenna matching is also possible in this case. The microcontroller 3 here ideally outputs the control voltage that was saved last.

Figure 8:
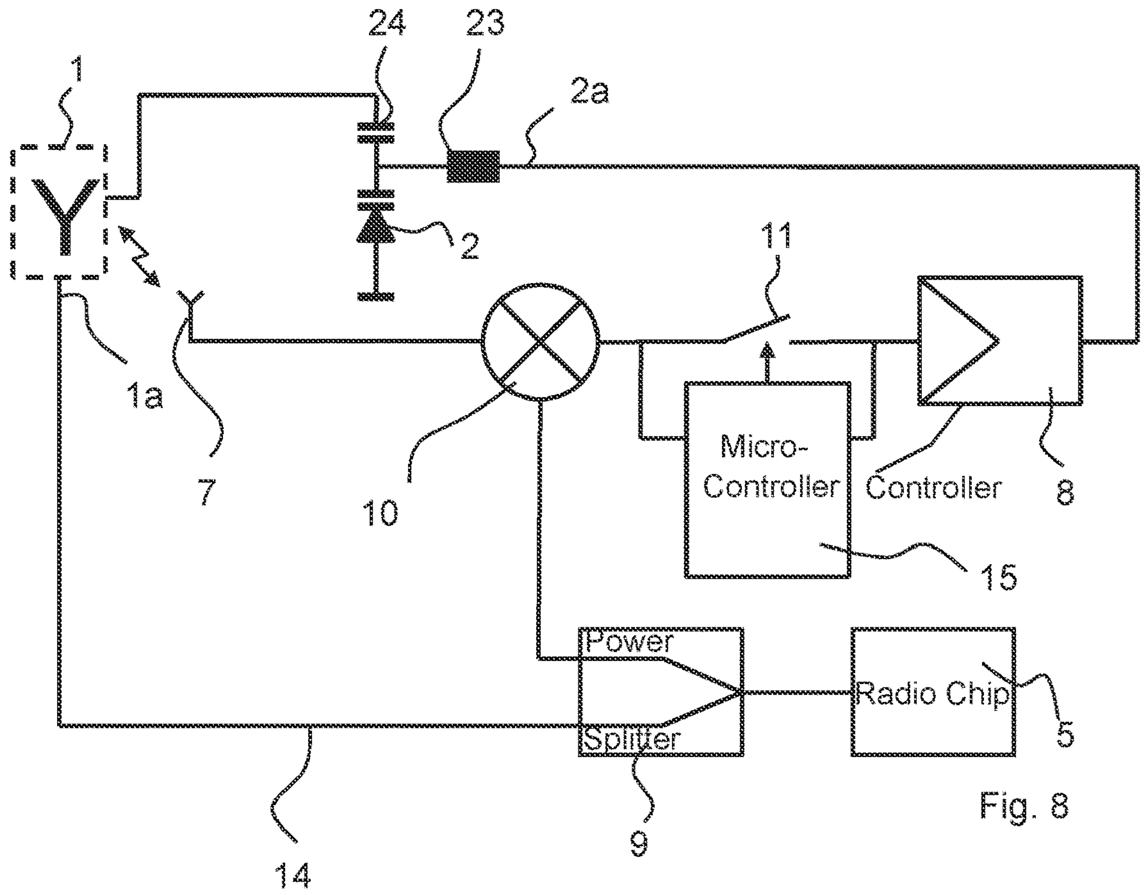
FIG. 8 is a block diagram by way of example of the wireless-node design according to FIG. 5 having a controller and a microcontroller.

The block diagram of a wireless node shown in FIG. 8 contains substantially all the function features of the wireless node shown in FIG. 5. A microcontroller 15 and a switch 11 are additionally provided, however. In the transmit case, the switch 11 is closed. The DC voltage flows in this case from the phase comparator 10 to the controller 8, which adjusts the control voltage to the varactor diode 2.

The microcontroller 15 can determine and store the voltage output by the phase comparator 10. In the receive case, the microcontroller 15 opens the switch 11 and outputs the voltage that was saved last, feeding this to the controller 8. The controller 8 thereupon outputs a control voltage to the varactor diode 2 so that the impedance and/or resonant frequency of the antenna 1 is adjusted. Antenna matching is thereby also possible in the receive case.

Figure 9:
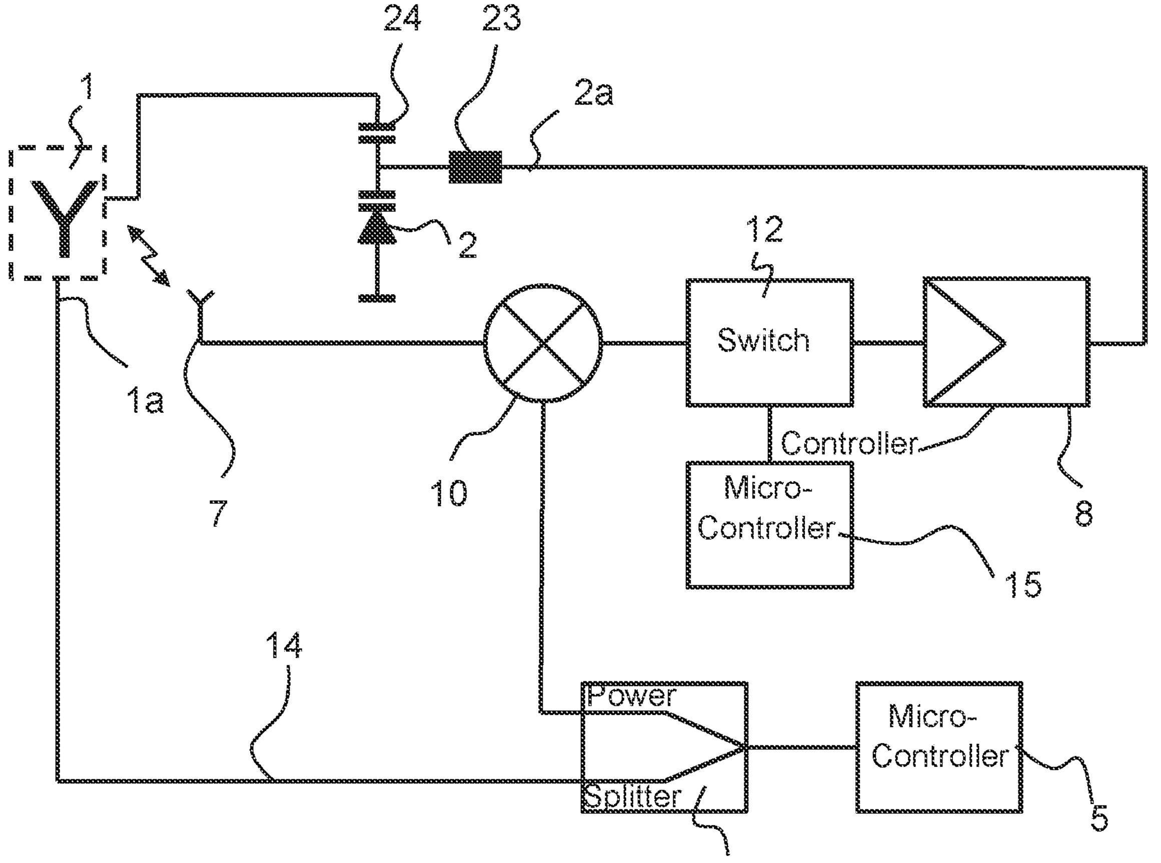
FIG. 9 is a block diagram by way of example of the wireless-node design according to FIG. 8 having an analog switch with hold function.

FIG. 9 shows an alternative embodiment of the wireless node of FIG. 5. In this case, an analog switch 12 having a hold function is provided between the phase comparator 10 and the controller 8, and is connected to the microcontroller 15. In the transmit case, the analog switch 12 transfers the DC voltage from the phase comparator 10 to the controller 8 and stores this voltage. The controller 8 thereupon outputs a control voltage for the varactor diode 2, which control voltage depends on the DC voltage. In the receive case, the microcontroller 15 actuates the analog switch 12 so that this feeds the last-saved DC voltage to the controller 8. Consequently, the method according to the third exemplary embodiment can also be used in the receive case.

Figure 10:
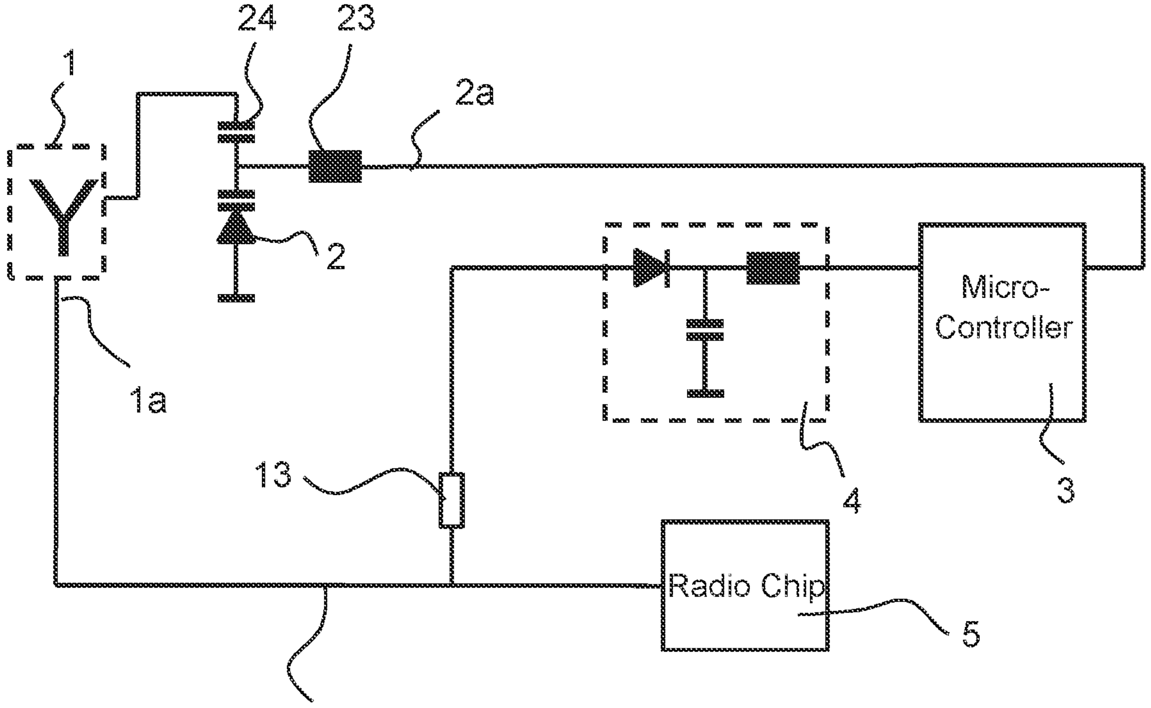
FIG. 10 is a block diagram by way of example of the wireless-node design for applying the method according to the invention according to a fourth exemplary embodiment.

FIG. 10 shows a block diagram of the wireless-node design for applying the method according to the invention according to a fourth exemplary embodiment. The design of the wireless node is here substantially equivalent to the design of the wireless node of FIG. 2. A coupling-out resistor 13, however, is provided instead of the coupler 6. At least a portion of the radio signal, or of its RF voltage, in the transmit path 14 is coupled out via this coupling-out resistor 13. The coupled-out portion of the radio signal, or of its RF voltage, constitutes a superposition of the forward and return waves.

The coupled-out radio signal is converted by the rectifier circuit 4 into a DC voltage or digitized, and fed to the microcontroller 3. The voltage fed to the microcontroller 3 is compared with a reference value or a reference voltage. The reference value has been determined in advance and corresponds to an optimum or desired impedance and/or resonant frequency of the antenna 1. The search phase and the SWEEP process is started if it is ascertained that the antenna is detuned, and/or periodically at equal or unequal time intervals. This involves checking what control signal for the varactor diode 2 is present when the reference value is reached.

In the fourth exemplary embodiment, ambiguities can arise from the superposition of the forward and return waves. In other words, a plurality of impedances and/or resonant frequencies of the antenna 1 result in the same DC voltage that is fed to the microcontroller 3. These ambiguities can be avoided by using pre-matching to actuate specifically not those impedances and/or resonant frequencies of the antenna 1 for which ambiguities can arise. These impedances and/or resonant frequencies can be determined in advance for this purpose.

Figure 11A:
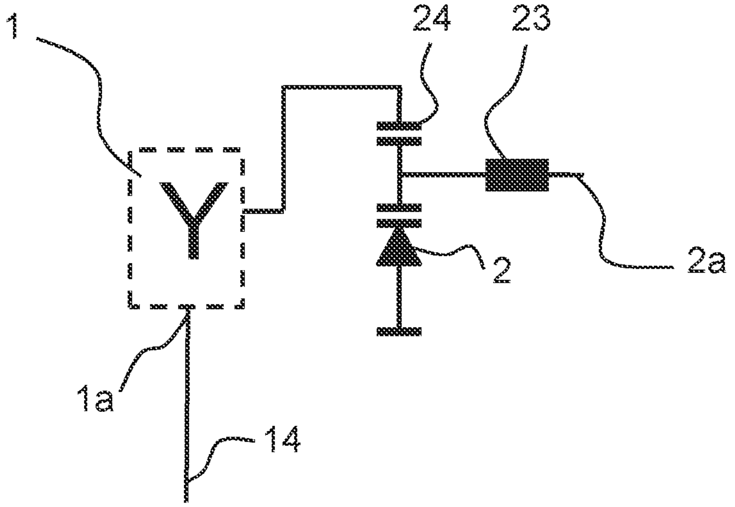
FIG. 11A is a block diagram by way of example of a first example of coupling a varactor diode to an antenna.
Figure 11B:
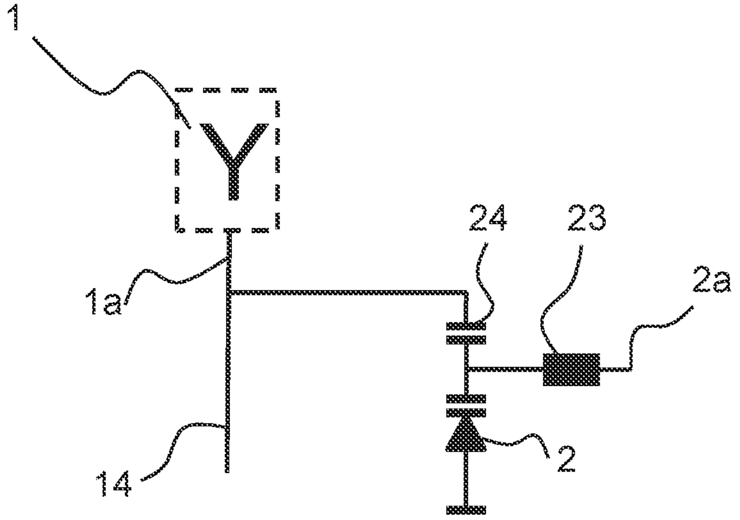
FIG. 11B is a block diagram by way of example of a second example of coupling a varactor diode to the antenna.

FIGS. 11A and 11B show different examples of coupling the varactor diode 2 to the antenna 1. According to the first coupling example, cf. FIG. 11A, the radio signal travels via the transmit path 14 and the antenna base 1*a* to the antenna 1. In this case, the varactor diode 2 has its own coupling to the antenna 1. Thus the radio signal and the capacitance load presented by the varactor diode 2 are isolated from each other.

According to the second coupling example, cf. FIG. 11 B, the varactor diode 2 and the transmit path 14 are coupled via the antenna base 1*a* to the antenna 1. Thus both have the same coupling point to the antenna 1.

Figure 12A:
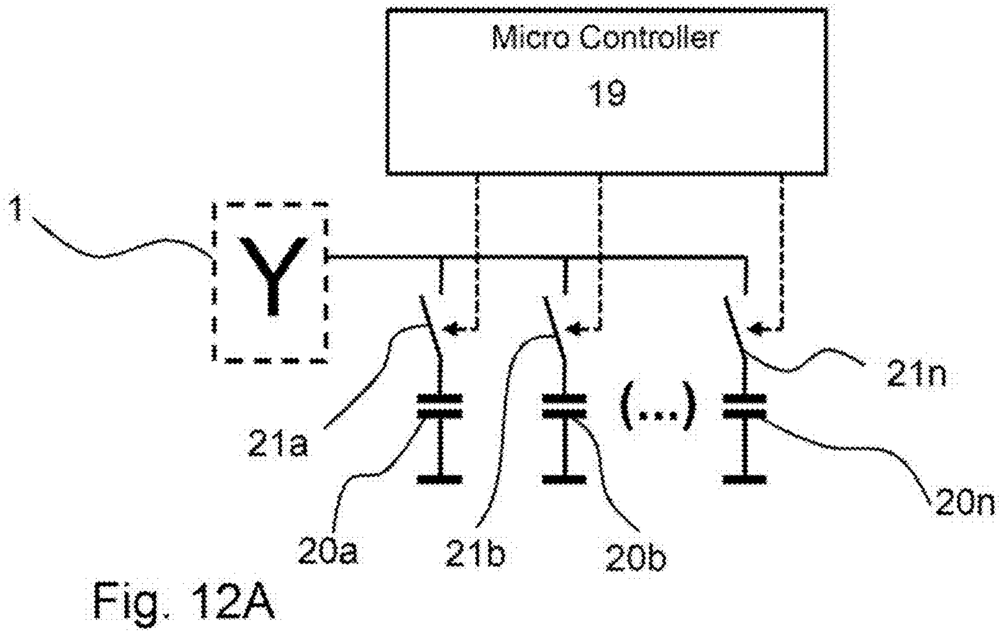
FIG. 12A is a block diagram by way of example of a capacitance network coupled to the antenna.
Figure 12B:
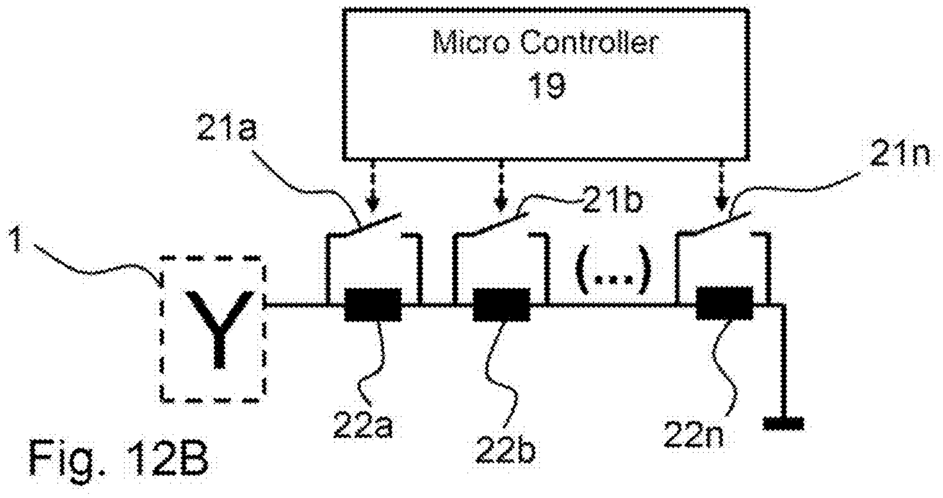
FIG. 12B is a block diagram by way of example of an inductance network coupled to the antenna.
Figure 12C:
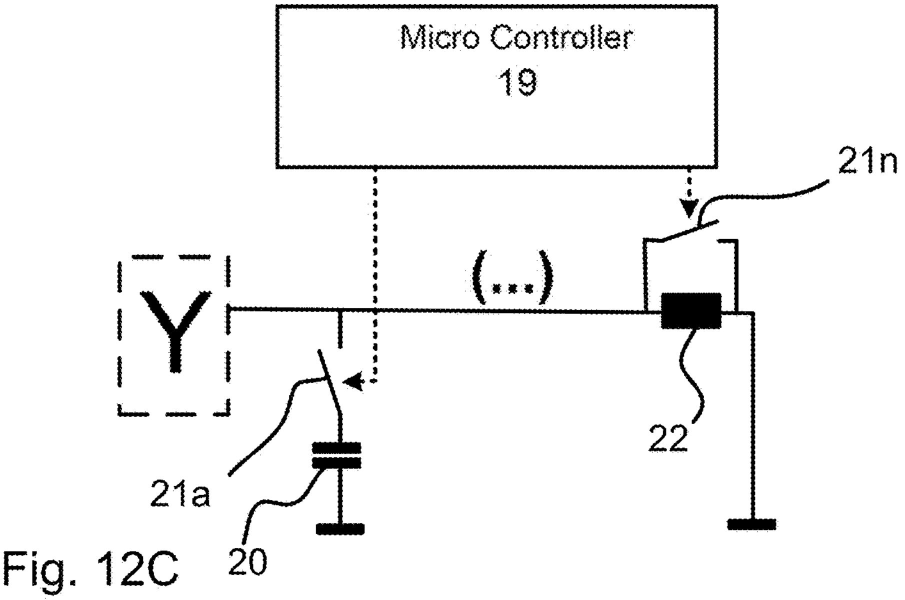
FIG. 12C is a block diagram by way of example of a capacitance and inductance network coupled to the antenna.

As an alternative or in addition to the varactor diode 2 for varying the impedance and/or the resonant frequency of the antenna 1, a switchable network of a plurality of capacitances 20*a-n* or a plurality of inductances 22*a-n* can be provided as shown in FIGS. 12A and 12B. It is also possible for the network to have a combination of at least one capacitance 20 and at least one inductance 22, as shown in FIG. 12C. The network can be coupled galvanically or capacitively or inductively to the antenna 1.

The network shown in FIG. 12A comprises a plurality of capacitances 20*a-n* and comprises switches 21*a-n*, which are assigned to the respective capacitances 20*a-n*. The switches 21*a-n* can be actuated individually by a microcontroller 19, being opened or closed thereby, so that the corresponding capacitances 20*a-n* can act on the antenna 1. The fact that the switches 21*a-n* can be actuated individually means that a single switch 21*a-n* or even a plurality of switches 21*a-n* can be closed so that different capacitances 20*a-n* are able to act simultaneously on the antenna 1. The capacitances 20*a-n* expediently have different values.

In addition, a switchable network of a plurality of inductances 22*a-n* can be provided, as shown in FIG. 12B, for varying the impedance and/or the resonant frequency of the antenna 1. The inductance network comprises a plurality of switches 21*a-n*, which are assigned to the corresponding inductances 22*a-n*. In a similar way to FIG. 12A, the switches 21*a-n* can be actuated individually by the microcontroller 19 so that the corresponding inductances 22*a-n* can act on the antenna. The inductances 22*a-n* can likewise have different values.

The wireless nodes according to the aforementioned exemplary embodiments can be operated expediently self-sufficiently in energy. For example, a battery (not shown in the figures), in particular a long-life battery, can be used for this purpose.

In addition, the wireless node may be part of a flowmeter or of an electricity meter or of an energy meter or of a consumption meter.

The invention hence makes it possible to determine the antenna detuning directly at the wireless node. The invention also makes it possible for the antenna detuning to be corrected by means of antenna matching performed independently by the wireless node. This is done in a simple manner by means of a circuit acting on the antenna 1, for instance a varactor diode 2, which adjusts the impedance and/or the resonant frequency of the antenna 1.

Explicit reference is made to the fact that the combination of individual features and sub-features is also deemed essential to the invention and covered by the disclosure in the application.

The following is a summary list of reference numerals and the corresponding structure used in the above description of the invention:

1 antenna
1*a* antenna base
2 varactor diode
2*a* control input
3 microcontroller
4 rectifier circuit
5 radio chip
6 coupler
6*a* terminating resistor
7 coupling antenna
8 controller
9 power splitter
10 phase comparator
11 switch
12 analog switch
13 coupling-out resistor
14 transmit path
15 microcontroller
16 interface
17 processing unit
18 interface
19 microcontroller
20*a-n* capacitance
21*a-n* switch
22*a-n* inductance
23 inductance
24 capacitance
25 sensor element
26 coupling-out element

The invention claimed is:

1. A method for improving antenna matching for a wireless node, which comprises the steps of:

coupling out a radio signal, or at least a portion thereof, of an antenna and/or out of a transmit path of the wireless node;

determining an impedance and/or a resonant frequency of the antenna from the radio signal or at least the portion thereof in the wireless node; and adjusting the impedance and/or the resonant frequency of the antenna according to the impedance and/or the resonant frequency by a circuit acting on the antenna, the circuit acting on the antenna including a switchable network including:

at least one capacitance;

at least one inductance; and a plurality of switches, each switch of the plurality being assigned to a respective one of the at least one capacitance and the at least one inductance, each switch of the plurality being associated with only one capacitance or inductance and being actuated individually to control whether the corresponding at least one capacitance and/or the corresponding at least one inductance acts on the antenna.

2. The method according to claim 1, wherein the circuit acting on the antenna has at least one varactor diode.

3. The method according to claim 1, wherein the circuit acting on the antenna is coupled galvanically or capacitively or inductively to the antenna.

4. The method according to claim 3, wherein the galvanically or capacitively or inductively coupling of the circuit is provided at the antenna and/or at an antenna base.

5. The method according to claim 1, wherein the at least one capacitance is a coupling capacitor and/or the at least one inductance is an inductor.

6. The method according to claim 1, wherein the circuit acting on the antenna has a microcontroller and/or a controller.

7. The method according to claim 1, wherein in order to couple out the radio signal, or at least the portion thereof, from the antenna and/or the transmit path, the method comprises the following substeps of:

coupling out a wave reflected by the antenna; or picking up power radiated by the antenna, or at least a portion thereof; or picking up energy on the antenna, or at least a portion thereof; or picking up a portion of the radio signal resulting from superposition of a forward wave and a return wave returning or reflected from the antenna.

8. The method according to claim 7, which further comprises supplying the return wave or the power picked-up or the energy picked-up or the portion of the radio signal picked-up to a rectifier circuit.

9. The method according to claim 7, which further comprises digitizing the return wave or the power picked-up or the energy picked-up or the portion of the radio signal picked-up by sampling or by means of an analog-to-digital converter.

10. The method according to claim 1, which further comprises performing a phase comparison between the radio signal coupled out of the antenna and the radio signal coupled out of the transmit path.

11. The method according to claim 1, which further comprises performing the antenna matching by means of a binary search process or by means of an algorithm or by means of a SWEEP process or in a closed-loop control system.

12. The method according to claim 1, which further comprises:

performing a search phase, in which the impedance and/or the resonant frequency of the antenna is/are determined;

performing an operating phase, during which the impedance and/or the resonant frequency of the antenna determined in the search phase is compared with a present impedance and/or resonant frequency of the antenna, and a new search phase is started:

(a) in an event of a discrepancy from a comparison; and/or (b) periodically at equal or unequal time intervals.

13. The method according to claim 1, which further comprises performing the adjusting of the impedance and/or the resonant frequency of the antenna in discrete levels.

14. The method according to claim 1, wherein:

the at least one capacitance is one of a plurality of capacitances; and/or the at least one inductance is one of a plurality of inductances.

15. A wireless node, comprising:

an antenna;

a radio chip;

a circuit acting on said antenna for adjusting an impedance and/or a resonant frequency of said antenna;

means for coupling out a radio signal, or at least a portion thereof, from said antenna and/or said transmit path;

means for determining the impedance and/or the resonant frequency of said antenna; and the wireless node is configured such that it can be operated in accordance with the method according to claim 1.

16. The wireless node according to claim 15, wherein said means for coupling-out has a coupler, and/or a coupling antenna, and/or a sensor element, and/or a coupling-out element, and/or a coupling-out resistor.

17. The wireless node according to claim 16, further comprising a printed circuit board; and wherein said coupler and/or said coupling antenna and/or said sensor element and/or said coupling-out element and/or said coupling-out resistor is/are provided as a structure on said printed circuit board.

18. The wireless node according to claim 15, wherein the wireless node is operated self-sufficiently in energy.

19. The wireless node according to claim 15, wherein the wireless node is part of a flowmeter or of an electricity meter or of an energy meter or of a consumption meter.

* * * * *